United States Patent
Son

(10) Patent No.: US 7,181,665 B2
(45) Date of Patent: Feb. 20, 2007

(54) DEVICE FOR TESTING SMART CARD AND METHOD OF TESTING THE SMART CARD

(75) Inventor: Won-Woo Son, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 292 days.

(21) Appl. No.: 10/912,006

(22) Filed: Aug. 5, 2004

(65) Prior Publication Data

US 2005/0034028 A1    Feb. 10, 2005

(30) Foreign Application Priority Data

Aug. 5, 2003    (KR)    ............... 10-2003-0054029

(51) Int. Cl.
G06F 11/00    (2006.01)
(52) U.S. Cl. .................... 714/742; 714/739
(58) Field of Classification Search ................ 235/492, 235/438; 324/158.1; 714/724, 738, 742, 714/739
See application file for complete search history.

(56) References Cited

U.S. PATENT DOCUMENTS 6,161,762 A * 12/2000 Bashan et al. .............. 235/492
6,394,346 B1 * 5/2002 Bonneau et al. ............ 235/438
6,466,007 B1 * 10/2002 Prazeres da Costa et al. ......... 324/158.1
6,484,279 B2 * 11/2002 Akram ....................... 714/724
6,640,323 B2 * 10/2003 Akram ....................... 714/724
6,756,777 B2 * 6/2004 Prazeres da Costa et al. ... 324/158.1

FOREIGN PATENT DOCUMENTS

KR    1994-8435    4/1994
KR    2003-38702    5/2003

OTHER PUBLICATIONS

Korean Patent Abstracts for Publication No. 2003-38702.
Korean Patent Abstracts for Publication No. 1994-8435.

* cited by examiner

Primary Examiner—David Ton
(74) Attorney, Agent, or Firm—F. Chau & Associates LLC

(57) ABSTRACT

Devices and methods are provided for testing various types of smart cards including contact, contactless, and hybrid type (contact/contactless) smart cards. A test device includes a logic tester, a contactless interface unit, and a contact interface unit. The logic tester generates a test pattern that is transmitted to a smart card to test the smart card and compares a received response pattern with a response pattern to test a status of the smart card. The contactless interface unit enables a contactless test mode of operation and the contact interface unit enables a contact test mode of operation.

10 Claims, 3 Drawing Sheets

| | TYPE A | TYPE B |
|---|---|---|
| LOGIC TESTER → SMART CARD | 0 1 0 0 1 | 0 1 0 0 1 |
| SMART CARD → LOGIC TESTER | 0 1 0 0 1 | 0 1 0 0 1 |

DEVICE FOR TESTING SMART CARD AND METHOD OF TESTING THE SMART CARD

CROSS-REFERENCE TO RELATED APPLICATION

This application claims priority to Korean Patent Application No. 2003-54029 filed on Aug. 5, 2003, which is fully incorporated herein by reference.

TECHNICAL FIELD OF THE INVENTION

The present invention relates generally to devices and methods for testing smart cards. More particularly, the present invention relates to devices and methods for testing various types of smart cards including, contact type, contactless type and hybrid type (both contact and contactless) smart cards.

BACKGROUND

In the field of electronic ID (identification) recognition, various applications have been developed using smart cards and radio frequency identification (RFID) cards for recognizing/verifying the ID of an individual for particular purposes.

In general, a smart card includes various components such as an integrated chip that has a microprocessor, an operating system, a security module, memory, etc. The integrated chip is embedded in the smart card and operates to process specific transactions. There are various types of smart cards including contact type smart cards, contactless type smart cards and hybrid type (both contact and contactless) smart cards.

Typically, a contactless type smart card system includes a contactless card reader and a contactless smart card. The contactless card reader generates an electromagnetic signal having a predetermined frequency. When the contactless smart card is activated, the contactless smart card waits for an instruction signal from the contactless card reader. The contactless smart card sends a response signal to the contactless card reader in response to the instruction signal when the instruction signal is correct. When the contactless card reader does not receive any response from the contactless smart card for some predetermined period of time (as specified by a standard specification), communications between the contactless smart card and the contactless card reader are terminated.

Various standards have been specified for smart card devices and applications. For instance, ISO/IDE 10536 and ISO/IEC 14443 are specifications that have been developed for contactless smart cards. Moreover, a contact type smart card is defined in ISO/IEC 7816. A contactless IC card is defined in ISO/IEC 10536, and a remote coupling communication card is defined in ISO/IEC 14443.

In general, logic testers have been developed for testing the status (defective/nondefective) of smart cards during the manufacturing process. In particular, for a contact type smart card, a conventional logic tester includes a pattern generator and a pattern comparator for testing the status of a contact type smart card. A conventional logic tester for a contact type smart card is interfaced to the smart card via a wired connection (cable connection to an input/output terminal of the smart card), and generates a logic pattern that is transmitted to the smart card via the wired connection, and analyzes a response pattern received from the smart card over the wired connection. These conventional logic testers cannot interface with contactless type smart cards.

SUMMARY OF THE INVENTION

Accordingly, exemplary embodiments of the invention provide devices and methods that can be used for testing various types of smart cards including contactless type smart cards, contact type smart cards or hybrid type smart cards.

In one exemplary embodiment, a test device is provided for testing different types of smart cards including contact, contactless or hybrid type smart cards. The test devices comprises: a logic tester which generates a test pattern to test a smart card, and which compares a received response pattern from the smart card with a predetermined response pattern to determine a status of the smart card; a contactless interface unit that modulates the test pattern onto a carrier signal to transmit the modulated signal to the smart card, demodulates a sub-carrier signal received from the smart card to restore the response pattern, and provides the logic tester with the response pattern, when the logic tester operates in a contactless test mode; and a contact interface unit which transmits the test pattern received from the logic tester to the smart card over a wired connection, and which provides the logic tester with the response pattern, when the logic tester operates in a contact test mode.

In another exemplary embodiment of the invention, the contactless interface unit comprises a logic interface that receives a clock signal, a peak-to-peak voltage signal, a modulation index, and logic data from the logic tester; an antenna; a transmitting unit that generates the carrier signal using the clock signal and the peak-to-peak voltage signal, and modulates the logic data based on the modulation index to transmit the modulated logic data via the antenna; and a receiving unit that demodulates the sub-carrier signal received from the antenna, and restores the response pattern to provide the logic interface with the restored response pattern.

In another exemplary embodiment of the invention, the transmitting unit comprises a carrier oscillator that generates the carrier signal having a same amplitude as the peak-to-peak voltage and having a frequency, wherein the carrier signal is synchronized with the clock signal; a modulator that modulates the logic data based on the modulation index onto the carrier signal; a filter that filters an output of the modulator; and an amplifier that amplifies an output of the filter to transmit the amplified signal via the antenna. Moreover, the receiving unit comprises a detector that demodulates the sub-carrier signal to detect data; and a converter that converts the detected data into the logic data.

In another exemplary embodiment, a method for testing a smart card includes generating a test pattern and selecting a contact test mode or a contactless test mode. When a contactless test mode is selected, the test method further includes modulating a carrier signal with logic data of the test pattern to generate a modulated signal; transmitting the modulated signal to a smart card; demodulating a sub-carrier signal received from the smart card to restore a response pattern; and comparing the response pattern and a predetermined response pattern; and displaying a contactless test mode result based on results of comparing the response pattern and the predetermined response pattern. When the contact test mode is selected, the test method further includes transmitting the test pattern to a smart card via a physical contact terminal; comparing a response pattern received from the smart card with a predetermined response pattern; and displaying a contact test mode result based on results of comparing the response pattern and the predetermined response pattern.

These and other exemplary embodiments, aspects, features, and advantages of the present invention will become apparent from the following detailed description of exemplary embodiments, which is to be read in connection with the accompanying drawings.

DETAILED DESCRIPTION OF EXEMPLARY EMBODIMENTS

Exemplary embodiments of the invention as described hereafter generally include devices and methods for testing various types of smart cards including contact, contactless, and hybrid type (contact/contactless) smart cards. The following detailed description includes high-level descriptions of structures and functions for implementing test devices and methods for testing smart cards according to various exemplary embodiments of the invention. Although specific details are provided for purposes of illustration, one of ordinary skill in the art can readily envision various alternative embodiments for implementing test devices and methods according to the invention and nothing herein shall be construed as limiting the scope of the invention. Indeed, it is to be noted that alternative exemplary embodiments of the invention may differ from those described herein with regard to actual functions or process steps depending upon the manner in which the test procedures are programmed or implemented. Given the teachings herein, one of ordinary skill in the related art will be able to contemplate these and similar implementations or configurations of the present invention.

Figure 1:
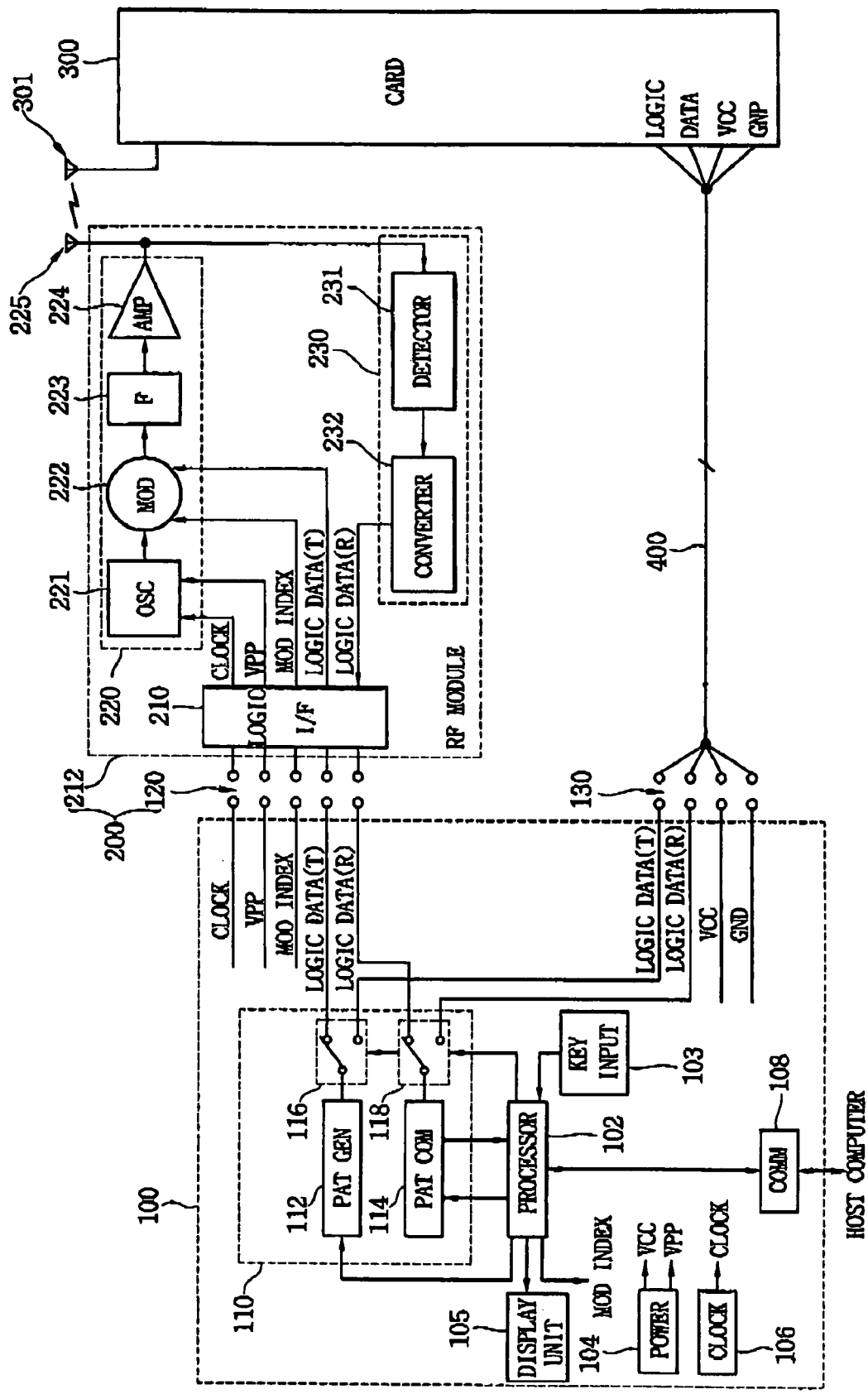
FIG. 1 is a block diagram illustrating a system for testing a smart card according to an exemplary embodiment of the present invention.

FIG. 1 is a block diagram illustrating a system for testing a smart card according to an exemplary embodiment of the invention. The system generally comprises a logic tester 100, a contactless interface unit 200, a contact interface unit 130, a smart card 300 and a test cable 400 (wired connection). The contactless interface unit 200 comprises a contactless interface connector 120 and an RF module 212. In general, the logic tester 100 can generate a test pattern that can be transmitted to the smart card 300 (via the RF module 212 or cable 400), and receive a response pattern (via the RF module 212 or cable 400) from the smart card 300 and compare the received response pattern with a predetermined response pattern to test a status of the smart card 300. The contactless interface unit 200 and contact interface unit 130 allows the logic tester 100 to interface with various types of smart cards, including hybrid (contact/contactless) smart cards (as depicted), a contactless type smart cards or contact type smart cards. Indeed, as explained below, the exemplary testing system of FIG. 1 comprises components and methods for testing contactless type smart cards as well as contact type smart cards.

More specifically, the logic tester 100 comprises a processor 102, a key input unit 103, a power supply unit 104, a display unit 105, a clock generator 106, a communication terminal 108, a channel unit 110, a corresponding contactless interface 120 to interface to the RF module 212 and a corresponding contact interface 130 to interface to the cable 400. The channel unit 110 comprises a pattern generator 112, a pattern comparator 114 and first and second switches 116 and 118. Although one channel 110 is depicted in the exemplary embodiment of FIG. 1, the logic tester 100 may comprise a plurality of channels to enable the logic tester 100 to simultaneously test a plurality of smart cards.

The processor 102 controls a test procedure in response to control signals input from a host computer via the communication terminal 108, or in response to key instructions input from a user via the key input unit 103. The processor 102 displays test results received from the pattern comparator 114 on the display unit 105, and transmits the test results to the host computer via the communication terminal 108. In a "contact test mode", the processor 102 controls the first and second switches 116 and 118 to connect the contact interface 130 to the pattern generator 112 and pattern comparator 114, respectively. In a "contactless test mode", the processor 102 controls the first and second switches 116 and 118 to connect the contactless interface 120 to the pattern generator 112 and pattern comparator 114, respectively.

The power supply 104 generates a power voltage VCC, a ground voltage GND and a peak-to-peak voltage VPP signal. The clock generator 106 generates clock signals for synchronizing the entire system during testing, including providing a clock signal CLOCK for synchronizing the RF module 212.

During a test mode, the pattern generator 112 generates a data pattern and outputs the data pattern to the contactless interface 120 or the contact interface 130 via the first switch 116, under control of the processor 102. The pattern comparator 114 receives a response pattern from the contactless interface 120 or the contact interface 130 via the second switch 118, and compares the response pattern with a predetermined response pattern to test the status of the smart card 300. In one exemplary embodiment, the data pattern and response pattern are generated in accordance with the ISO/IEC 14443 protocol, which is well known in the art.

The contactless interface 120 enables the logic tester 100 to interface with the RF module 212 and exchange signals such as clock signal CLOCK, peak-to-peak voltage VPP signal, a modulation index (Mod Index), logic data signals (Logic Data (T), Logic Data (R)), etc. The contact interface 130 enables the logic tester 100 to interface with the smart card 300 via the cable 400 connection and exchange various signals including logic data signals (Logic Data (T), Logic Data (R)), power voltage VCC and GND, etc., over the physical cable 400.

The RF module 212 generally comprises a logic interface device 210, a transmitting unit 220, and a receiving unit 230. The logic interface 210 interfaces with the logic tester 100 via interface 120. The transmitting unit 220 modulates a received test pattern onto a carrier signal, and transmits the modulated carrier signal to a contactless type smart card via an antenna 225. The receiving unit 230 demodulates a sub-carrier signal received from a contactless type smart card via the antenna 225, and restores a response pattern that is to be provided to the logic tester 100.

The transmitting unit 220 comprises a carrier oscillator 221, a modulator 222, a filter 223 and an amplifier 224. The carrier oscillator 221 generates a carrier signal having an amplitude which is substantially the same as the peak-to-peak voltage VPP signal, and having a frequency of 13.56 MHz, for example. The carrier signal synchronizes with the clock signal CLOCK. The modulator 222 modulates the logic data (Logic Data (T)) based on the modulation index (Mod Index) onto the carrier signal. The filter 223 filters an output of the modulator 222, and the amplifier 224 amplifies an output of the filter 223 to transmit the amplified signal via the antenna 225.

The receiving unit 230 comprises a detector 231 connected to the antenna 225 and a converter 232. The detector 231 demodulates a sub-carrier signal received from the antenna 225 to detect data (response pattern received from the smart card 300). The converter 232 converts the detected data into the logic data (Logic Data (R)). The receiving unit 230 provides the logic tester 100 with the response pattern data received from the contactless type smart card via the logic interface 210.

The contact/contactless hybrid type smart card 300 comprises a loop antenna 301 for wireless communication with the RF unit 212. The smart card 300 comprises a well known architecture including an analog signal processor, a digital signal processor, a logic operator, a contact interface, and a power supply, the details of which are not necessary for understanding the invention. Briefly, the analog signal processor receives the carrier signal from the RF module 212 via the loop antenna 301, demodulates the received carrier signal, and outputs the demodulated signal to the digital signal processor. The analog signal processor performs a load modulation for the data received from the digital signal processor, and transmits the load-modulated data via the loop antenna 301. The logic operator includes a microprocessor CPU, a memory circuitry and a logic circuitry, and communicates with the logic tester 100 according to a predetermined protocol.

Figures 3, 4:
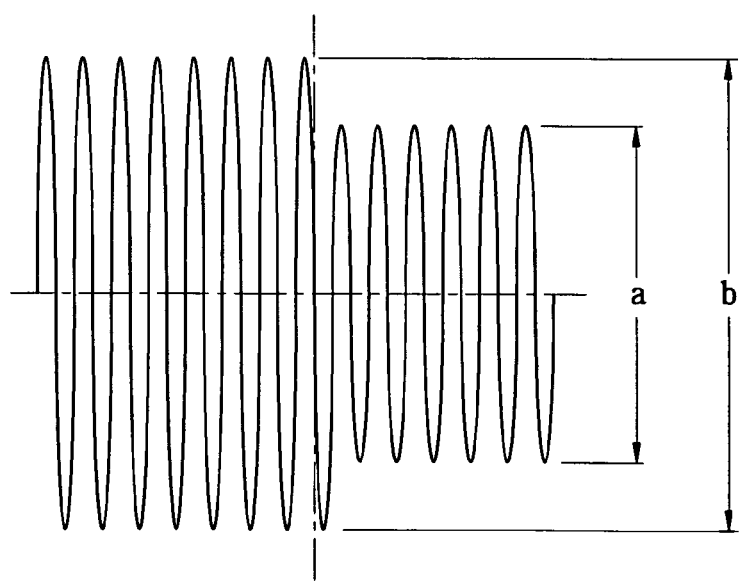
FIG. 3 is an exemplary diagram illustrating various types of signals that can be used for transmitting/receiving signals between a test device and a smart card for testing the smart card, according to exemplary embodiments of the invention.
FIG. 4 is graphically illustrates a method for modulating a carrier signal based on a modulation index according to an exemplary embodiment of the invention.

In one exemplary embodiment of the invention, a smart card testing system and method is based on the ISO/IEC 14443 protocol, wherein RF signals transmitted and received between the smart card 300 and the RF module 212 have waveforms as depicted in the exemplary embodiments of FIGS. 3 and 4. More specifically, FIG. 3 depicts exemplary types of transmitting/receiving signals according to the ISO-14443 specification, and FIG. 4 is illustrates an exemplary modulation process for modulating a carrier signal using a modulation index (Mod Index).

Referring to FIG. 3, the ISO-14443 specification defines signals of type 'A' and type 'B'. In one exemplary embodiment of the invention as depicted in FIG. 3, a type 'A' signal transmitted from the logic tester 100 to the smart card 300 is an Amplitude Shift Keying (ASK) signal having an modulation index of 100%, and is obtained by modulating 106 kbit/s data stream encoded by a modified Miller encoding scheme onto 13.56 MHz of carrier signal. Further, a type 'B' signal transmitted from the logic tester 100 to the smart card 300 is an Amplitude Shift Keying (ASK) signal having an modulation index of 10%, and is obtained by modulating 106 kbit/s data stream encoded by a Non Return Zero encoding scheme onto 13.56 MHz of carrier signal.

In another exemplary embodiment, a type 'A' signal transmitted from the smart card 300 to the logic tester 100 is an On-Off Keying (OOK) signal, which is obtained by modulating 106 kbit/s data stream encoded by a Manchester encoding scheme onto 13.56 MHz of sub-carrier signal.

Moreover, a type 'B' signal transmitted from the smart card 300 to the logic tester 100 is an Binary Phase Shift Keying (BPSK) signal, which is obtained by modulating 106 kbit/s data stream encoded by a Non Return Zero encoding scheme onto 13.56 MHz of sub-carrier signal.

Referring to FIG. 4, a modulation index (Mod Index) is determined as $$ModIndex = \frac{(b-a)}{(b+a)} \cdot (100\%),$$

wherein "a" denotes a peak-to-peak amplitude of the carrier signal corresponding to a logic level '0' of the logic data generated by the pattern generator 112, and "b" denotes a peak-to-peak amplitude of the carrier signal corresponding to a logic level '1' of the logic data. In one exemplary embodiment, the carrier frequency is about 13.56 MHz, and "b" is the substantially the same as the amplitude of the VPP signal. In other words, in one exemplary embodiment of the invention, the signals transmitted between the logic tester 100 and the smart card 300 are determined by the carrier frequency, the modulation index (Mod Index) such as 100% or 10%, VPP and the logic data.

Figure 2:
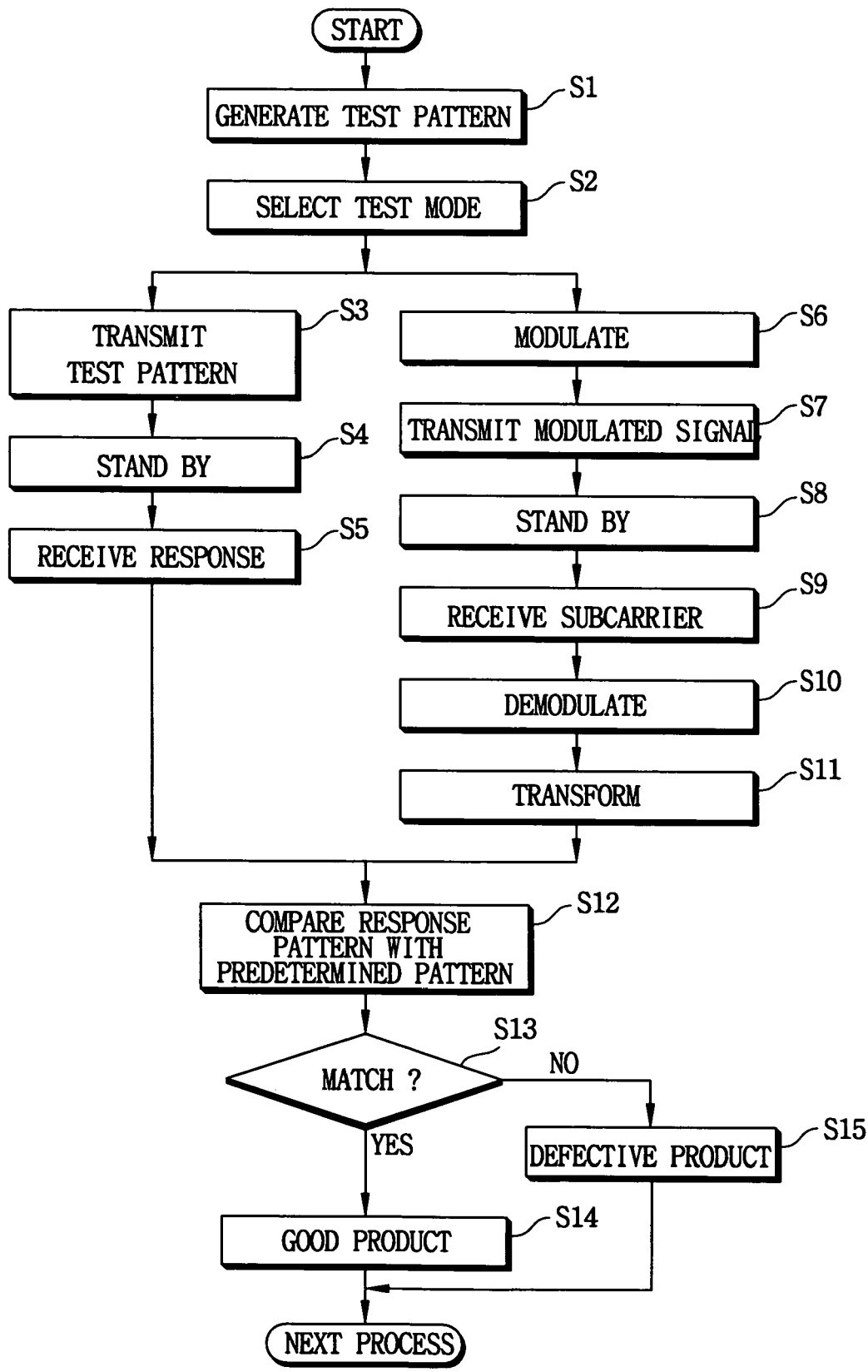
FIG. 2 is a flow diagram illustrating a method for testing a smart card according to an exemplary embodiment of the present invention.

FIG. 2 is a flow diagram illustrating a method for testing a smart card according to an exemplary embodiment of the invention. In particular, FIG. 2 illustrates different modes of operation of the smart card testing system discussed above with reference to FIG. 1 according to an exemplary embodiment of the invention. which can be implemented for testing various types of smart cards including contact, contactless and hybrid type (contact/contactless) smart cards. For purposes of illustration, the method of FIG. 2 will be discussed with reference to the exemplary test system of FIG. 1. As discussed above, a smart card can be coupled to the test device 100 in one or more ways. Indeed, when the smart card is a contactless type smart card, the smart card can be coupled to the logic tester 100 via the RF module 200. When the smart card is a contact type smart card, the smart card can be connected to the logic tester 100 via the cable 400. When the smart card is a hybrid type, both connection interfaces can be used.

Referring to FIG. 2, a test pattern is generated by the pattern generator 112 (step S1). A test mode (contact test mode or contactless test mode) is selected (step S2). When the test mode is a "contact test mode", the first switch 116 connects the output of the pattern generator 112 to the contact interface 130 so that the test pattern is transmitted (step S3) to the smart card via the cable connection 400. In addition, the second switch 118 connects the contact interface 130 to the input of the pattern comparator 144 to receive a response pattern received from the smart card over the cable connection 400. In particular, in a contact test mode, the logic tester 100 transmits the test pattern to the smart card via the physical cable (step S3), then waits for a stand-by period (step S4), and receives the response pattern (step S5).

Afterwards, the pattern comparator 114 of the logic tester 100 compares the received response pattern with a predetermined (anticipated) response pattern (step S12). If the response pattern is substantially the same as the predetermined response pattern (affirmative determination in step (S13)), the smart card is regarded as a good product (step S14). Namely, the smart card is regarded as in a good status. On the other hand, if the received response pattern is not substantially the same as the predetermined response pattern (negative determination in step (S13)), the smart card is deemed defective (step S15). The result of the test may be displayed on the display unit 105, and may be transmitted to the host computer.

In a contactless test mode (as selected in step S2), the RF module 200 will modulate the logic data received from the logic tester 100 onto the carrier signal (step S6), transmit the modulated carrier signal (step S7) to the smart card, wait for a stand-by period (step S8), and then receive a sub-carrier signal (step S9). The RF module 200 demodulates the received sub-carrier signal (step S10), and converts the sub-carrier signal into the logic data (step S11), which is sent to the logic tester 100.

The pattern comparator 114 of the logic tester 100 compares the received response pattern with a predetermined (anticipated) response pattern (step S12). If the response pattern is substantially the same as the predetermined response pattern (affirmative determination in step (S13)), the smart card is regarded as a good product (step S14). Namely, the smart card is regarded as in a good status. On the other hand, if the received response pattern is not substantially the same as the predetermined response pattern (negative determination in step (S13)), the smart card is deemed defective (step S15). The result of the test may be displayed on the display unit 105, and may be transmitted to the host computer. The above process can be repeated for additional smart cards to be tested.

As discussed above, exemplary embodiments of the present invention provide devices and methods that enable both wireless and wired interfaces for testing various types of smart cards including contactless, contact, or hybrid type smart cards, which enable reduction in the costs and overhead for testing smart cards.

While the exemplary embodiments of the present invention and their advantages have been described in detail, it should be understood that various changes, substitutions and alterations may be made herein without departing from the scope of the invention.

What is claimed is:

1. A test device for testing a contact type, a contactless type or a contact/contactless hybrid type smart card, the device comprising:
    a logic tester which generates a test pattern to test a smart card, and which compares a received response pattern from the smart card with a predetermined response pattern to determine a status of the smart card;
    a contactless interface unit that modulates the test pattern onto a carrier signal to transmit the modulated signal to the smart card, demodulates a sub-carrier signal received fom the smart card to restore the response pattern, and provides the logic tester with the response pattern, when the logic tester operates in a contactless test mode; and
    a contact interface unit which transmits the test pattern received from the logic tester to the smart card over a wired connection, and which provides the logic tester with the response pattern, when the logic tester operates in a contact test mode,
    wherein the contactless interface unit comprises:
    a logic interface that receives a clock signal, a peak-to-peak voltage signal, a modulation index, and logic data from the logic tester;
    an antenna;
    a transmitting unit that generates the carrier signal using the clock signal and the peak-to-peak voltage signal, and modulates the logic data based on the modulation index to transmit the modulated logic data via the antenna; and
    a receiving unit that demodulates the sub-carrier signal received from the antenna, and restores the response pattern to provide the logic interface with the restored response pattern.

2. The device of claim 1, wherein the transmitting unit comprises:
    a carrier oscillator that generates the carrier signal having a same amplitude as the peak-to-peak voltage and having a frequency, wherein the carrier signal is synchronized with the clock signal;
    a modulator that modulates the logic data based on the modulation index onto the carrier signal;
    a filter that filters an output of the modulator; and
    an amplifier that amplifies an output of the filter to transmit the amplified signal via the antenna.

3. The device of claim 1, wherein the receiving unit comprises:
    a detector that demodulates the sub-carrier signal to detect data; and
    a converter that converts the detected data into the logic data.

4. The device of claim 1, wherein the logic tester comprises:
    a pattern generator that generates the test pattern in response to a first control signal;
    a first switch that selects the contactless interface unit or the contact interface unit in response to a second control signal;
    a pattern comparator that compares the response pattern with the predetermined response pattern to test a status of the smart card;
    a second switch that selects a first response pattern received from the contactless interface unit or a second response pattern received from the contact interface unit in response to a third control signal to provide the pattern comparator with the selected response pattern; and
    a processor that generates the first, second and third control signals to control a testing procedure.

5. A test device for testing a smart card, comprising:
    a logic test circuit which generates a test pattern for testing a smart card, and which processes a response pattern received from the smart card in response to the test pattern to determine a status of the smart card;
    a contactless interface unit comprising a transmitter and a receiver for wirelessly transmitting a test pattern and a response pattern between the logic test circuit and the smart card, when the logic test circuit operates in a contactless test mode; and
    a contact interface unit for transmitting a test pattern and a response pattern between the logic test circuit and the smart card over a wired connection, when the logic test circuit operates in a contact test mode,
    wherein the logic test circuit comprises:
    a processor;
    a pattern generator that generates the test pattern in response to a first control signal generated by the processor; and
    a pattern comparator that compares the response pattern with a predetermined response pattern to test the status of the smart card;
    a first switch that couples the output of the pattern generator to the contactless interface unit or the contact interface unit under control of the processor; and a second switch that couples the input of the pattern comparator to the contactless interface unit or the contact interface unit under control of the processor.

6. The test device of claim 5, wherein the transmitter comprises an oscillator that generates a carrier signal, and a modulator that generates a modulated signal modulating the carrier signal with logic data of a test pattern, and transmits the modulated signal to the smart card.

7. The test device of claim 6, wherein the logic test circuit comprises:
- a processor that generates a modulation index;
- a clock generator that generates a clock signal; and
- a voltage generator that generates a VPP (peak-to-peak voltage) signal, wherein the oscillator generates the carrier signal based on the VPP signal and clock signal, and wherein the modulator encodes the logic data of the test pattern based on the modulation index.

8. The test device of claim 6, wherein the transmitter further comprises:
- a filter to filter an output of the modulator; and
- an amplifier to amplify an output of the filter.

9. The test device of claim 5, wherein the receiver comprises:
- a detector that demodulates the sub-carrier signal to detect data; and
- a converter that converts the detected data into logic data of a response pattern.

10. A method of testing a smart card, the method comprising:
- generating a test pattern;
- selecting a contact test mode or a contactless test mode;
- when a contactless test mode is selected, generating a modulation index, generating a clock signal; generating a VPP (peak-to-peak voltage) signal; generating a carrier signal based on the VPP signal and clock signal modulating the carrier signal with logic data of the test pattern based on the modulation index to generate a modulated signal; transmitting the modulated signal to a smart card; demodulating a sub-carrier signal received from the smart card to restore a response pattern; and comparing the response pattern and a predetermined response pattern; and displaying a contactless test mode result based on results of comparing the response pattern and the predetermined response pattern; and
- when a contact test mode is selected, transmitting the test pattern to a smart card via a physical contact terminal; comparing a response pattern received from the smart card with a predetermined response pattern; and displaying a contact test mode result based on results of comparing the response pattern and the predetermined response pattern.

* * * * *